(12) United States Patent
Geen

(10) Patent No.: US 6,837,107 B2
(45) Date of Patent: Jan. 4, 2005

(54) MICRO-MACHINED MULTI-SENSOR PROVIDING 1-AXIS OF ACCELERATION SENSING AND 2-AXES OF ANGULAR RATE SENSING

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/462,542

(22) Filed: Jun. 16, 2003

(65) Prior Publication Data

US 2004/0211257 A1 Oct. 28, 2004

Related U.S. Application Data

(60) Provisional application No. 60/466,090, filed on Apr. 28, 2003.

(51) Int. Cl.$^7$ ................................................. G01P 9/04
(52) U.S. Cl. .................................. 73/504.04; 73/504.12
(58) Field of Search ......................... 73/504.04, 504.12, 73/510

(56) References Cited

U.S. PATENT DOCUMENTS

| | | | |
|---|---|---|---|
| 4,715,227 A | 12/1987 | Pittman | 73/504 |
| 4,744,248 A | 5/1988 | Stewart | 73/505 |
| 4,744,249 A | 5/1988 | Stewart | 73/505 |
| 4,841,773 A | 6/1989 | Stewart | 73/510 |
| 5,007,279 A | 4/1991 | Miall | 72/394 |
| 5,313,835 A | 5/1994 | Dunn | 73/505 |
| 5,392,650 A | 2/1995 | O'Brien et al. | 73/517 |
| 5,590,460 A | 1/1997 | DiStefano et al. | 29/830 |
| 5,712,426 A | 1/1998 | Sapuppo et al. | 73/504.03 |
| 5,869,760 A | 2/1999 | Geen | 73/504.12 |
| 6,305,222 B1 | 10/2001 | Johnson et al. | 73/504.12 |
| 6,308,569 B1 | 10/2001 | Stewart | 73/514.32 |
| 6,508,122 B1 | 1/2003 | McCall et al. | 73/504.12 |

*Primary Examiner*—John E. Chapman
(74) *Attorney, Agent, or Firm*—Weingarten, Schurgin, Gagnebin & Lebovici LLP

(57) ABSTRACT

A micro-machined multi-sensor that provides 1-axis of acceleration sensing and 2-axes of angular rate sensing. The multi-sensor includes a plurality of accelerometers, each including a mass anchored to and suspended over a substrate by a plurality of flexures. Each accelerometer further includes acceleration sense electrode structures disposed along lateral and longitudinal axes of the respective mass. The multi-sensor includes a fork member coupling the masses to allow relative antiphase movement, and to resist in phase movement, of the masses, and a drive electrode structure for rotationally vibrating the masses in antiphase. The multi-sensor provides electrically independent acceleration sense signals along the lateral and longitudinal axes of the respective masses, which are added and/or subtracted to obtain 1-axis of acceleration sensing and 2-axes of angular rate sensing.

16 Claims, 6 Drawing Sheets

MICRO-MACHINED MULTI-SENSOR PROVIDING 1-AXIS OF ACCELERATION SENSING AND 2-AXES OF ANGULAR RATE SENSING

CROSS REFERENCE TO RELATED APPLICATIONS

This application claims priority of U.S. Provisional Patent Application No. 60/466,090 filed Apr. 28, 2003 entitled MICROMACHINED MULTISENSOR PROVIDING 1-AXIS OF ACCELERATION SENSING AND 2-AXES OF ANGULAR RATE SENSING.

STATEMENT REGARDING FEDERALLY SPONSORED RESEARCH OR DEVELOPMENT

N/A

BACKGROUND OF THE INVENTION

The present invention relates generally to integrated acceleration and angular rate sensors ("multi-sensors"), and more specifically to a micro-machined multi-sensor capable of providing 1-axis of acceleration sensing and 2-axes of angular rate sensing.

Micro-machined multi-sensors are known that comprise at least one accelerometer for providing indications of acceleration sensing and angular rate sensing in a single sensor device. A conventional micro-machined multi-sensor, as described in U.S. Pat. No. 5,392,650 issued Feb. 28, 1995 entitled MICRO-MACHINED ACCELEROMETER GYROSCOPE, comprises two accelerometers, in which each accelerometer includes a rigid accelerometer frame anchored to a substrate, and a proof mass suspended from the rigid frame by a plurality of flexures. The micro-machined multi-sensor typically has a single acceleration-sensing axis, and a single rotation-sensing axis perpendicular to the acceleration axis, associated therewith. Further, the micro-machined multi-sensor is typically configured for simultaneously vibrating the proof masses in antiphase along a vibration axis, which is perpendicular to the acceleration and rotation axes.

In the event the conventional micro-machined multi-sensor is subjected to linear and rotational motions while the proof masses are simultaneously vibrated in an antiphase manner, forces of linear and Coriolis acceleration are generated that deflect the proof masses relative to the substrate. The multi-sensor is configured to sense the deflections of the respective proof masses, and to produce corresponding acceleration sense signals having values proportional to the magnitude of the deflection. Because the responses of the vibrating proof masses to linear acceleration are in phase, and the responses of the proof masses to Coriolis acceleration are in antiphase, the linear acceleration components (containing the acceleration sensing information), and the rotational acceleration components (containing the angular rate sensing information), of the sense signals can be separated by adding or subtracting the signals to cancel the rotational or linear components, respectively.

One drawback of the above-described conventional micro-machined multi-sensor is that it typically provides only 1-axis of acceleration sensing, and only 1-axis of angular rate sensing. However, it is often advantageous to provide more than one axis of acceleration sensing and/or angular rate sensing in a single sensor device.

A second conventional micro-machined sensor capable of measuring rates of rotation relative to two rotation-sensing axes is described in U.S. Pat. No. 5,869,760 issued Feb. 9, 1999 entitled MICRO-MACHINED DEVICE WITH ROTATIONALLY VIBRATED MASSES. The micro-machined sensor comprises two accelerometers, in which each accelerometer includes a mass in the form of a circular beam suspended over a substrate by a plurality of flexures, and an adjacent pair of acceleration-sensing electrodes. The two rotation-sensing axes associated with the micro-machined sensor are in the plane of the substrate. Further, the micro-machined sensor is configured for rotationally vibrating the circular beams in an antiphase manner, i.e., alternately rotating one circular beam clockwise/counterclockwise while the other beam simultaneously rotates in the opposite direction by substantially the same amount.

In the event the second conventional micro-machined sensor is subjected to linear and rotational motions while the circular beams are simultaneously rotated in antiphase, forces of linear and Coriolis acceleration are generated that deflect the beams relative to the substrate. The acceleration-sensing electrodes sense the deflections of the respective beams, and produce corresponding acceleration sense signals proportional to the magnitude of the deflection and the rate of rotation relative to the rotation-sensing axes. Because the sign of the rotational acceleration components (containing the angular rate sensing information) of the sense signals corresponds to the direction of rotation of the circular beams, the rotational components can be separated from the linear acceleration components of the sense signals by subtracting the signals to cancel the linear components. However, although the micro-machined sensor is capable of providing more than one axis of angular rate sensing, it has drawbacks in that it typically provides no acceleration sensing information.

It would therefore be desirable to have a micro-machined multi-sensor device that provides both acceleration sensing and angular rate sensing, and avoids the drawbacks of the above-described conventional micro-machined sensor devices.

BRIEF SUMMARY OF THE INVENTION

In accordance with the present invention, a micro-machined multi-sensor is disclosed that provides 1-axis of acceleration sensing and 2-axes of angular rate sensing. The presently disclosed micro-machined multi-sensor comprises at least one pair of accelerometers, which provide electrically independent acceleration sense signals including information pertaining to acceleration sensing and angular rate sensing relative to one or more sensing axes.

In a first embodiment, the micro-machined multi-sensor comprises a pair of accelerometers, each accelerometer including a mass suspended over and anchored to a substrate by a plurality of flexures. The multi-sensor has two associated, mutually orthogonal rotation-sensing axes in the plane of the substrate, and one associated acceleration-sensing axis perpendicular to the two rotation axes. Further, each mass has lateral and longitudinal axes of symmetry, and a rotation axis perpendicular to the lateral and longitudinal axes, associated therewith. Each accelerometer further includes a first pair of acceleration sense electrode structures disposed along the lateral axis, and a second pair of acceleration sense electrode structures disposed along the longitudinal axis, of the respective masses. The multi-sensor further comprises a fork member configured to couple the two masses to allow relative antiphase movement, and to resist in phase movement, of the masses. The pluralities of flexures anchoring the masses to the substrate are configured to constrain the masses to move substantially only in a rotational manner relative to the substrate.

In the presently disclosed embodiment, the micro-machined multi-sensor comprises a drive electrode structure configured for rotationally vibrating the masses in antiphase, i.e., alternately rotating one mass clockwise/counterclockwise about its rotation axis, while the other mass simultaneously rotates about its rotation axis in the opposite direction by substantially the same amount. In the event the multi-sensor with the rotationally vibrating masses is subjected to linear and/or rotational motion, the first and second pairs of acceleration sense electrodes produce electrically independent acceleration sense signals based on forces of linear and Coriolis acceleration imposed on the masses. The multi-sensor is configured (1) to add the difference of the accelerations sensed by the first pair of acceleration sense electrodes of the first accelerometer, and the difference of the accelerations sensed by the first pair of acceleration sense electrodes of the second accelerometer, to obtain information pertaining to angular rate sensing relative to the lateral rotation axis of the multi-sensor, (2) to add the difference of the accelerations sensed by the second pair of acceleration sense electrodes of the first accelerometer, and the difference of the accelerations sensed by the second pair of acceleration sense electrodes of the second accelerometer, to obtain information pertaining to angular rate sensing relative to the longitudinal rotation axis of the multi-sensor, and (3) to add the sum of the accelerations sensed by the first pair of acceleration sense electrodes of the first accelerometer, the sum of accelerations sensed by the first pair of acceleration sense electrodes of the second accelerometer, the sum of accelerations sensed by the second pair of acceleration sense electrodes of the first accelerometer, and the sum of accelerations sensed by the second pair of acceleration sense electrodes of the second accelerometer, to obtain information pertaining to acceleration sensing relative to the acceleration axis of the multi-sensor.

In a second embodiment, the micro-machined multi-sensor comprises four accelerometers arranged to form a square. Each accelerometer includes a mass suspended over and anchored to a substrate. The multi-sensor further comprises respective fork members coupling adjacent pairs of masses to allow relative antiphase movement, and to resist in phase movement, of the adjacent masses. The micro-machined multi-sensor has two associated, mutually orthogonal rotation-sensing axes in the plane of the substrate, and one associated acceleration-sensing axis perpendicular to the two rotation axes. Each accelerometer further includes a first pair of acceleration sense electrode structures disposed along a lateral axis, and a second pair of acceleration sense electrode structures disposed along a longitudinal axis, of the respective mass. The accelerometers are arranged in mirror image fashion on opposite sides of the respective rotation axes. Because of the enhanced symmetry of this second embodiment of the micro-machined multi-sensor, the multi-sensor device can be more easily centered on a die, thereby reducing adverse effects of die surface area distortions and gradients.

By configuring the above-described micro-machined multi-sensors to include a plurality of accelerometers, each accelerometer having a mass and providing two pairs of electrically independent acceleration sense signals along lateral and longitudinal axes of symmetry of the mass, respectively, 1-axis of acceleration sensing and 2-axes of angular rate sensing can be obtained by suitably adding and/or subtracting the acceleration sense signals.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/466,090 filed Apr. 28, 2003 entitled MICROMACHINED MULTISENSOR PROVIDING 1-AXIS OF ACCELERATION SENSING AND 2-AXES OF ANGULAR RATE SENSING is incorporated herein by reference.

A micro-machined multi-sensor is disclosed that provides 1-axis of acceleration sensing and 2-axes of angular rate sensing in a single sensor device. The presently disclosed multi-sensor can be symmetrically laid out on a die, thereby improving yield as well as improving the overall performance of the multi-sensor device.

Figure 1:
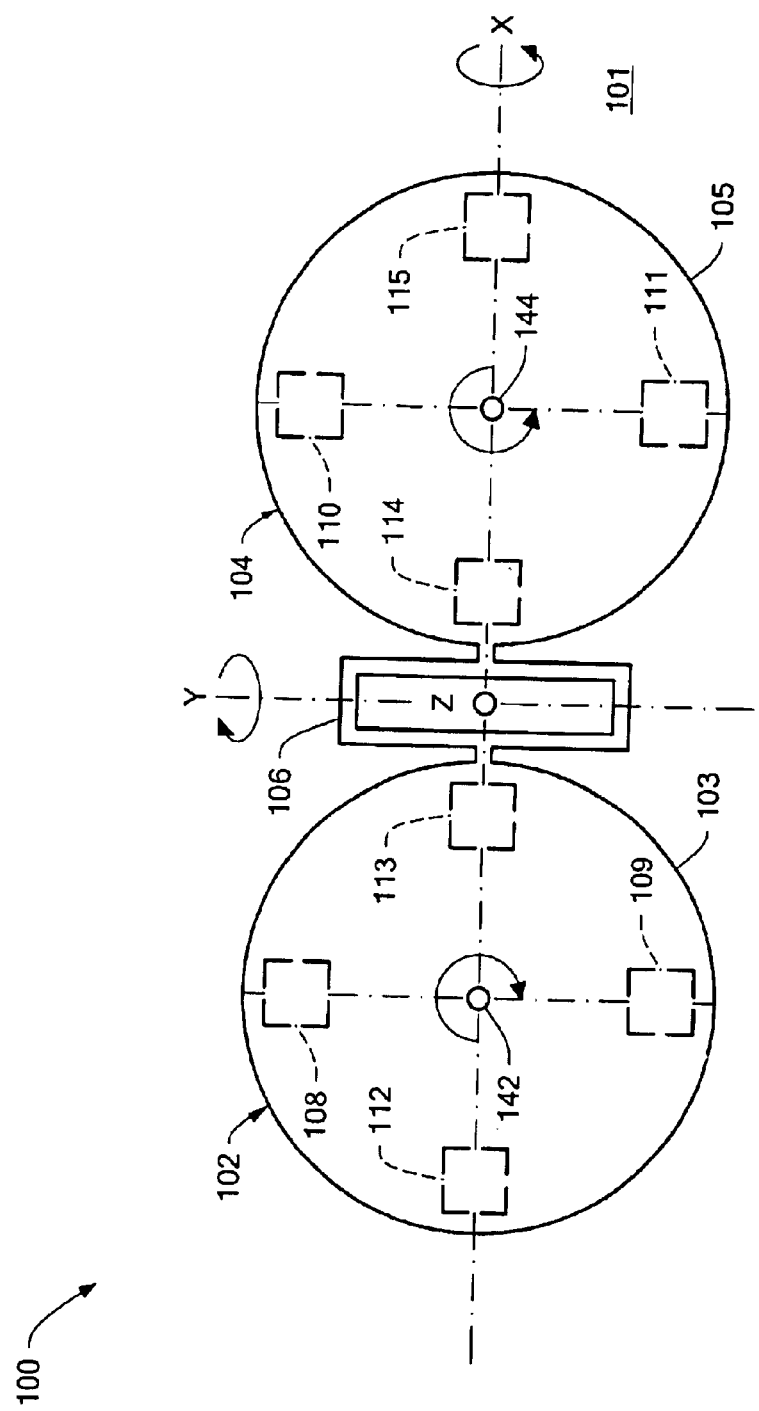
FIG. 1 is a simplified block diagram of a micro-machined multi-sensor according to the present invention.

FIG. 1 depicts an illustrative embodiment of a micro-machined multi-sensor 100, in accordance with the present invention. In the illustrated embodiment, the multi-sensor 100 comprises a plurality of accelerometers 102 and 104. The accelerometers 102 and 104 include masses 103 and 105, respectively, each of which is substantially circular. It should be understood that the masses 103 and 105 may alternatively be substantially square, hexagonal, octagonal, or any other suitable geometric shape. The circular masses 103 and 105 are anchored to and suspended over a substrate 101 by a plurality of flexures (not shown). The multi-sensor 100 further comprises a fork member 106 configured to couple the two circular masses 103 and 105 to allow relative antiphase movement, and to resist in phase movement, of the masses. The pluralities of flexures anchoring the circular masses 103 and 105 and suspending them over the substrate 101 are configured to constrain the masses to move substantially only in a rotational manner in a plane parallel to the substrate but also in tilt or translational modes perpendicular to the substrate 101.

For example, the substrate 101 may comprise a silicon substrate, or any other suitable type of substrate. Further, the substrate 101 may be subjected to any suitable bulk micromachining process to form the Micro Electro Mechanical System (MEMS) multi-sensor device. It is noted that the circular masses 103 and 105 and the coupling fork 106 of the MEMS multi-sensor 100 may be formed via any suitable process in the art.

As shown in FIG. 1, the multi-sensor 100 has two associated, mutually orthogonal rotation-sensing axes X and Y in the plane of the substrate 101, and one associated acceleration-sensing axis Z perpendicular to the rotation axes X and Y (i.e., perpendicular to the substrate 101). The multi-sensor 100 is configured to provide two indications of angular rate sensing relative to the rotation axes X and Y, and one indication of acceleration sensing relative to the acceleration axis Z. Further, each of the circular masses 103 and 105 has lateral and longitudinal axes of symmetry (not labeled), and a rotation axis (i.e., rotation axes 142 and 144, see FIG. 1) perpendicular to the lateral and longitudinal axes, associated therewith.

The multi-sensor 100 also includes acceleration sense electrode structures 108–115 disposed along the longitudinal and lateral axes of the respective circular masses 103 and 105. Specifically, the acceleration sense electrode structures 108–109 and 112–113 are diametrically opposed to each other along the longitudinal and lateral axes, respectively, of the circular mass 103, and the acceleration sense electrode structures 110–111 and 114–115 are diametrically opposed to each other along the longitudinal and lateral axes, respectively, of the circular mass 105. Each one of the acceleration sense electrode structures 108–115 includes a first electrode disposed on the surface of the respective circular mass, and a second electrode disposed on the surface of the substrate 101 opposite the first electrode, forming a differential capacitor having a capacitance value that increases/decreases based on the distance between the first and second electrodes. The multi-sensor 100 includes circuitry configured to sense changes in the capacitance values, and to provide electrically independent acceleration sense signals that include information pertaining to angular rate sensing and acceleration sensing relative to the rotation axes X,Y and the acceleration axis Z, respectively. For example, each of the first and second electrodes of the acceleration sense electrode structures 108–115 may be made from polycrystalline silicon ("polysilicon"), a diffused region, a metal, or any other suitable material.

Figure 2:
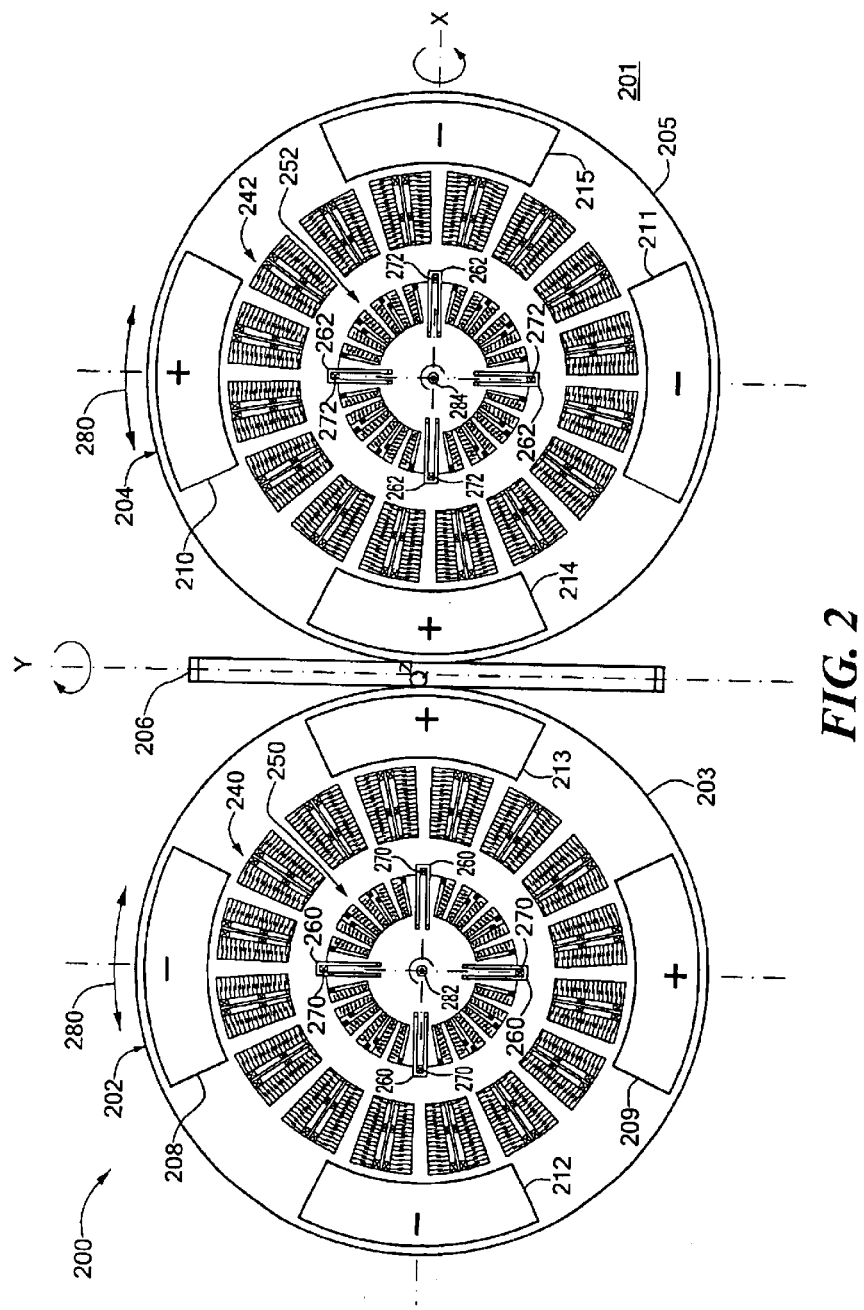
FIG. 2 is a detailed plan view of the micro-machined multi-sensor of FIG. 1.

FIG. 2 depicts a detailed plan view 200 of the micro-machined multi-sensor 100 (see FIG. 1). As shown in FIG. 2, the micro-machined multi-sensor 200 comprises a plurality of accelerometers 202 and 204. The accelerometers 202 and 204 include substantially circular masses 203 and 205, respectively, which are anchored to and suspended over a substrate 201 such as a silicon substrate by pluralities of flexure structures. Specifically, each of the flexure structures anchoring and suspending the circular mass 203 includes an anchor 270 and a stress relief member 260, and each of the flexure structures anchoring and suspending the circular mass 205 includes an anchor 272 and a stress relief member 262.

The multi-sensor 200 further comprises a fork member 206, and acceleration sense electrode structures 208–215. The fork member 206 is configured to couple the two circular masses 203 and 205 to allow relative antiphase rotational movement, and to resist in phase rotational movement, of the masses, as known in the art. The acceleration sense electrode structures 208–215 are disposed along longitudinal and lateral axes of the respective circular masses 203 and 205.

Figure 3:
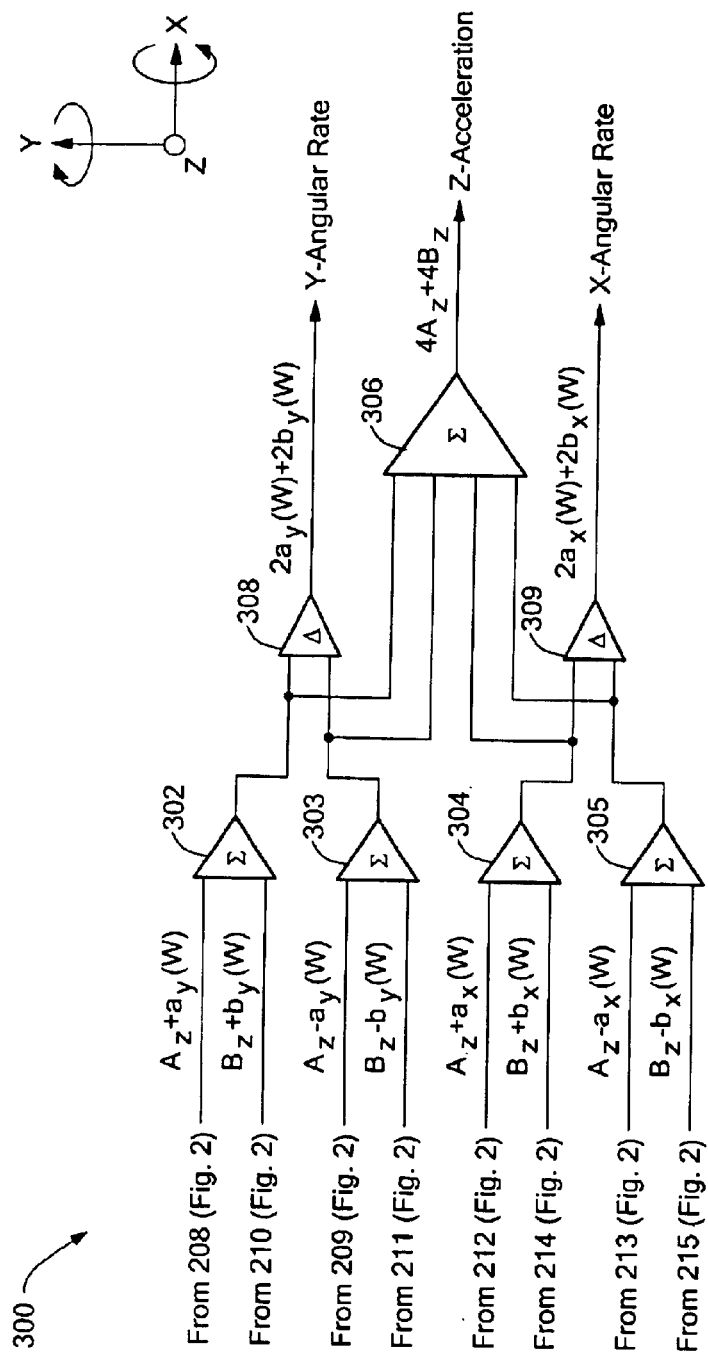
FIG. 3 is a schematic diagram of acceleration sense signal processing circuitry for the micro-machined multi-sensor of FIG. 1.

It is noted that the circular masses 203 and 205, the fork member 206, and the acceleration sense electrode structures 208–215 are substantially equivalent to the circular masses 103 and 105, the fork member 106, and the acceleration sense electrode structures 108–115, respectively, of the multi-sensor 100 (see FIG. 1). Further, rotation-sensing axes X and Y and acceleration-sensing axis Z, as depicted in FIG. 3, correspond to the rotation-sensing axes X and Y and the acceleration-sensing axis Z described above with reference to FIG. 1.

As shown in FIG. 2, the multi-sensor 200 includes a plurality of drive electrode structures 240 and 242 anchored to the substrate 201, and configured for rotationally vibrating the circular masses 203 and 205 in antiphase, i.e., alternately rotating one mass clockwise/counterclockwise about its rotation axis, while the other mass simultaneously rotates about its rotation axis in the opposite direction by substantially the same amount. Specifically, the drive electrode structures 240 are employed for rotationally vibrating the circular mass 203 about the rotation axis 282, and the drive electrode structures 242 are employed for rotationally vibrating the circular mass 205 about the rotation axis 284. In the presently disclosed embodiment, the drive electrode structures 240 and 242 are disposed along radial axes of the circular masses 203 and 205, respectively. Further, each of the drive electrode structures 240 and 242 includes a plurality of electrodes ("fingers") interdigitated with a corresponding plurality of fingers extending from at least one radial edge of the circular mass 203 and 205, respectively. The drive electrode structures 240 and 242 are coupled to a signal source (not shown) for generating drive signals operative to rotationally vibrate the masses 203 and 205 in antiphase in an oscillating manner, as depicted by directional arrows 280.

It is noted that the primary purpose of the circular geometry is to provide a pivot and lever to translate the anti-parallel linear motions of the diametrically opposed mass segments 203 and 205 into a motion suitable for coupling with the fork 206. Accordingly, the useful motion of the mass segments 203 and 205 in generating Coriolis force is the dominant linear component, not rotation as such.

The multi-sensor 200 further includes a plurality of velocity sense electrode structures 250 and 252 anchored to the substrate 201, and configured to sense the vibration velocity of the circular masses 203 and 205, respectively. In the presently disclosed embodiment, the velocity sense electrode structures 250 and 252 are disposed along radial axes of the circular masses 203 and 205, respectively. Further, the velocity sense electrode structures 250 and 252 include pluralities of fingers interdigitated with corresponding pluralities of fingers extending from radial edges of the circular masses 203 and 205, respectively. The interdigitated fingers of the velocity sense electrode structures 250 and 252 form differential capacitors having capacitance values that increase/decrease based on whether the circular masses 203 and 205 rotate in a clockwise or counterclockwise manner. The multi-sensor 200 includes circuitry (not shown) configured to sense these changes in capacitance values, and to provide velocity sense signals indicative of the vibration velocity of the circular masses 203 and 205 based on the changing capacitance values.

Those of ordinary skill in the art will appreciate that as the circular masses 203 and 205 vibrate about the rotation axes 282 and 284, respectively, while the multi-sensor 200 rotates about a radial axis (not labeled) of the masses 203 and 205, the masses 203 and 205 undergo Coriolis. Further, because the circular masses 203 and 205 vibrate in antiphase, the Coriolis acceleration is imposed on the respective masses in opposite directions. As a result, apparent Coriolis forces are applied to the circular masses 203 and 205, deflecting the masses 203 and 205 in opposite directions relative to the substrate 201.

For example, "+" and "−" signs are employed in FIG. 2 to indicate the relative directions of deflection of the circular masses 203 and 205 due to the applied Coriolis forces. As shown in FIG. 2, the acceleration sense electrode structures 208–209 and 212–213 of the mass 203 are labeled −, +, −, and +, respectively, and the corresponding acceleration sense electrode structures 210–211 and 214–215 of the mass 205 are labeled with the opposite signs +, −, +, and −, respectively, to indicate that the applied Coriolis forces deflect these corresponding regions of the masses 203 and 205 in opposite directions relative to the substrate 201.

It is noted that the acceleration sense electrode structures 208–209 along the longitudinal axis, and the acceleration sense electrode structures 212–213 along the lateral axis, of the circular mass 203, are labeled with the opposite signs − and +, respectively. Similarly, the acceleration sense electrode structures 210–211 along the longitudinal axis, and the acceleration sense electrode structures 214–215 along the lateral axis, of the circular mass 205, are labeled with the opposite signs + and −, respectively. This is because, in the presently disclosed embodiment, the circular masses 203 and 205 are rigid structures configured to tilt relative to the substrate 201 in response to the applied Coriolis forces.

Moreover, because the applied Coriolis forces deflect the circular masses 203 and 205 in opposite directions, the responses of the masses 203 and 205 to Coriolis acceleration relative to the rotation axes X and Y are in antiphase, while the responses of the circular masses 203 and 205 to linear acceleration relative to the acceleration axis Z are in phase. Accordingly, the electrically independent sense signals provided via the acceleration sense electrode structures 208–215 can be added and/or subtracted to extract information corresponding to the linear acceleration (i.e., the acceleration sensing information), and to extract information corresponding to the Coriolis acceleration (i.e., the angular rate sensing information), from the sense signals.

FIG. 3 depicts an illustrative embodiment of acceleration sense signal processing circuitry 300, which is configured to extract the acceleration sensing information and the angular rate sensing information from the acceleration sense signals provided by the acceleration sense electrode structures 208–215 (see FIG. 2). For example, the signal processing circuitry 300 may be implemented on the same substrate as the multi-sensor 200. In the illustrated embodiment, the sense signal processing circuitry 300 includes a plurality of difference amplifiers 308–309 and a plurality of summing amplifiers 302–306, which subtract/add the accelerations sensed by the acceleration sense electrode structures 208–215 to extract the acceleration sensing and angular rate sensing information.

Specifically, the acceleration sensed by the acceleration sense electrode structures 208–209 includes a linear component Az relative to the acceleration axis Z, and a time-varying rotational component ay(w) relative to the rotation axis Y; and, the acceleration sensed by the acceleration sense electrode structures 210–211 includes a linear component Bz relative to the acceleration axis Z, and a time-varying rotational component by(w) relative to the rotation axis Y. It is noted that the rotational components ay(w) and by(w) vary at an angular vibrating frequency w, and are proportional to the rate of rotation about a radial axis perpendicular to the vibration velocity vector. Because the vibration velocities of the masses 203 and 205 are opposed, the accelerations sensed by the acceleration sense electrode structures 208–209 are Az+ay(w) and Az−ay(w), respectively, and the accelerations sensed by the acceleration sense electrode structures 210–211 are Bz+by(w) and Bz−by(w), respectively. Similarly, the accelerations sensed by the acceleration sense electrode structures 212–213 are Az+ax(w) and Az−ax(w), respectively, and the accelerations sensed by the acceleration sense electrode structures 214–215 are Bz+bx(w) and Bz−bx(w), respectively.

As described above, the responses of the circular masses 203 and 205 (see FIG. 2) to Coriolis acceleration relative to the rotation axes X and Y are in antiphase, while the responses of the circular masses 203 and 205 to linear acceleration relative to the acceleration axis Z are in phase. Accordingly, the responses of the circular masses 203 and 205 to Coriolis acceleration relative to the rotation axes X and Y, as represented by the accelerations ay(w) and −ay(w), by(w) and −by(w), ax(w) and −ax(w), and bx(w) and −bx(w), are in antiphase, while the responses of the masses 203 and 205 to linear acceleration relative to the acceleration axis Z, as represented by the accelerations Az and Bz, are in phase.

As shown in FIG. 3, signals representative of the accelerations Az+ay(w) and Az−ay(w) sensed by the electrode structures 208–209 are applied to the summing amplifiers 302–303, respectively, and signals representative of the accelerations Bz+by(w) and Bz−by(w) sensed by the electrode structures 210–211 are applied to the summing amplifiers 302–303, respectively. The summing amplifiers 302–303 are configured to add the respective signals applied thereto, and to provide resulting signal sums to the difference amplifier 308, which is configured to subtract these signals to cancel out the linear components Az and Bz and to generate a signal 2ay(w)+2by(w) indicative of angular rate sensing relative to the rotation axis Y ("Y-Angular Rate").

Similarly, signals representative of the accelerations Az+ax(w) and Az−ax(w) sensed by the electrode structures 212–213 are applied to the summing amplifiers 304–305, respectively, and signals representative of the accelerations Bz+bx(w) and Bz−bx(w) sensed by the electrode structures 214–215 are applied to the summing amplifiers 304–305, respectively. The summing amplifiers 304–305 are configured to add the respective signals applied thereto, and to provide resulting signal sums to the difference amplifier 309, which is configured to subtract these signals to cancel out the linear components Az and Bz and to generate a signal 2ax(w)+2bx(w) indicative of angular rate sensing relative to the rotation axis X ("X-Angular Rate").

As shown in FIG. 3, the summing amplifiers 302–305 also provide the signal sums at their respective outputs to the summing amplifier 306, which is configured to add these signals to cancel out the rotational components ax(w), bx(w), ay(w), and by(w) and to generate a signal 4Az+4Bz indicative of acceleration sensing relative to the acceleration axis Z ("Z-Acceleration").

Figure 4:
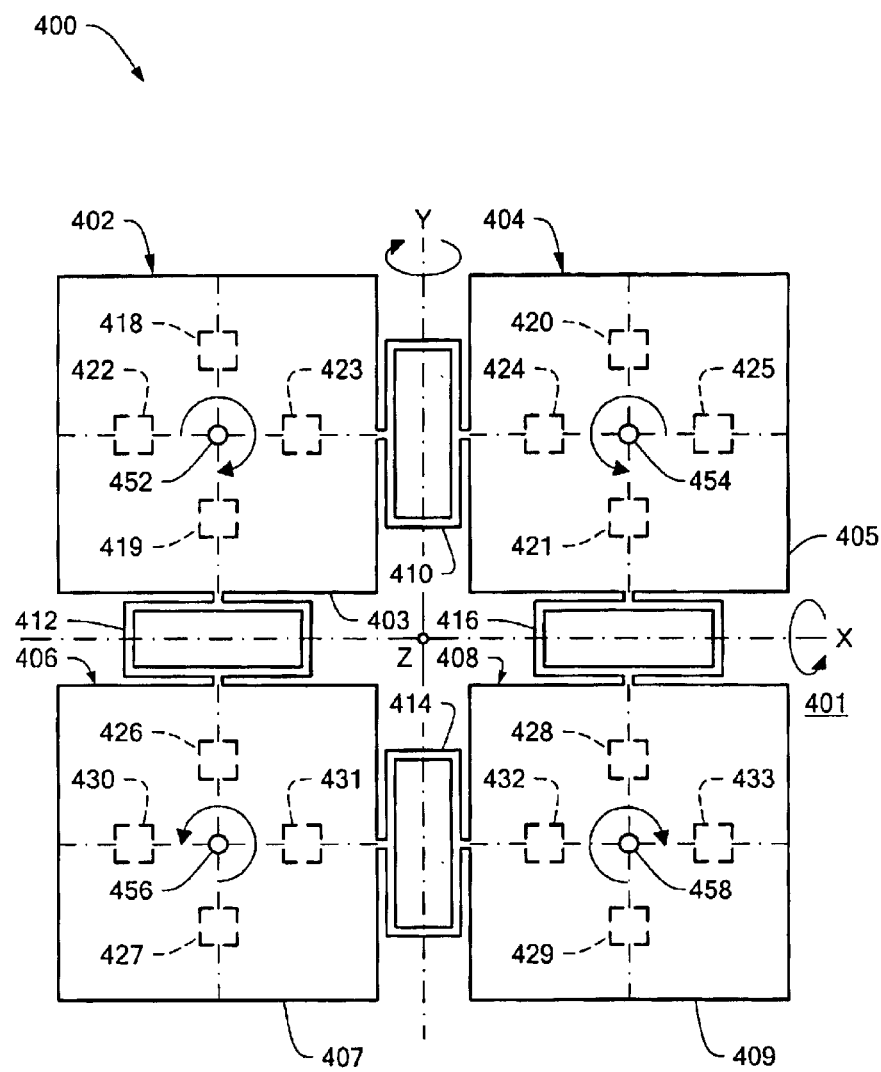
FIG. 4 is a simplified block diagram of an alternative embodiment of the micro-machined multi-sensor of FIG. 1.

FIG. 4 depicts a second illustrative embodiment of a micro-machined multi-sensor 400, in accordance with the present invention. In the illustrated embodiment, the multi-sensor 400 comprises a plurality of accelerometers 402, 404, 406, and 408, which are arranged to form a square. The accelerometers 402, 404, 406, and 408 include masses 403, 405, 407, and 409, respectively, each of which is substantially square-shaped. It should be understood, however, that the masses 403, 405, 407, and 409 may alternatively be substantially circular, hexagonal, octagonal, or any other suitable geometric shape.

The square masses 403, 405, 407, and 409 are suspended over and anchored to a substrate 401 by a plurality of flexures (not shown). The multi-sensor 400 further comprises a fork member 410 coupling the adjacent masses 403 and 405, a fork member 412 coupling the adjacent masses 403 and 407, a fork member 414 coupling the adjacent masses 407 and 409, and a fork member 416 coupling the adjacent masses 405 and 409. The fork members 410, 412, 414, and 416 are configured to couple the masses 403, 405, 407, and 409 to allow relative antiphase rotational movement, and to resist in phase rotational movement, of the adjacent masses about rotation axes 452, 454, 456, and 458.

Like the substrate 201 of the multi-sensor 200 (see FIG. 2), the substrate 401 of the multi-sensor 400 (see FIG. 4) may comprise a silicon substrate, or any other suitable type of substrate. Further, the substrate 401 may be subjected to any suitable bulk micro-machining process to form the MEMS multi-sensor device.

As shown in FIG. 4, the multi-sensor 400 has two associated, mutually orthogonal rotation-sensing axes X and Y in the plane of the substrate 401, and one associated acceleration-sensing axis Z perpendicular to the rotations axes X and Y. Like the multi-sensor 200 (see FIG. 2), the multi-sensor 400 provides two indications of angular rate sensing relative to the rotation axes X and Y, and one indication of acceleration sensing relative to the acceleration axis Z.

The multi-sensor 400 also includes acceleration sense electrode structures 418–421, 426–429 and 422–425, 430–433 diametrically disposed along longitudinal and lateral axes, respectively, of the masses 403, 405, 407, and 409. Each one of the acceleration sense electrode structures 418–433 includes a first electrode disposed on the surface of a respective mass, and a second electrode disposed on the surface of the substrate 401 opposite the first electrode, to form a differential capacitor having a capacitance value that varies based on the distance between the first and second electrodes. Such capacitance values are employed to provide electrically independent acceleration sense signals including information pertaining to angular rate sensing and acceleration sensing relative to the rotation axes X, Y and the acceleration axis Z, respectively.

For example, the acceleration sense electrode structures 418–419, 420–421, 426–427, and 428–429 may be employed to provide indications of accelerations Az+ay(w) and Az−ay(w), Bz+by(w) and Bz−by(w), Cz+cy(w) and Cz−cy(w), and Dz+dy(w) and Dz−dy(w), respectively, in which Az, Bz, Cz, and Dz are linear acceleration components relative to acceleration axis Z, and ay(w), by(w), cy(w), and dy(w) are time-varying rotational acceleration components relative to the rotation axis Y. Further, the acceleration sense electrode structures 422–423, 430–431, 424–425, and 432–433 may be employed to provide indications of accelerations Az+ax(w) and Az−ax(w), Bz+bx(w) and Bz−bx(w), Cz+cx(w) and Cz−cx(w), and Dz+dx(w) and Dz−dx(w), respectively, in which ax(w), bx(w), cx(w), and dx(w) are time-varying rotational acceleration components relative to the rotation axis X. By suitably subtracting the respective accelerations, the linear components cancel out, leaving the rotational components including information pertaining to angular rate sensing relative to the rotation axes X and Y. Moreover, by suitably adding the respective accelerations, the rotational components cancel out, leaving the linear components including information pertaining to acceleration sensing relative to the acceleration axis Z.

Figure 5:
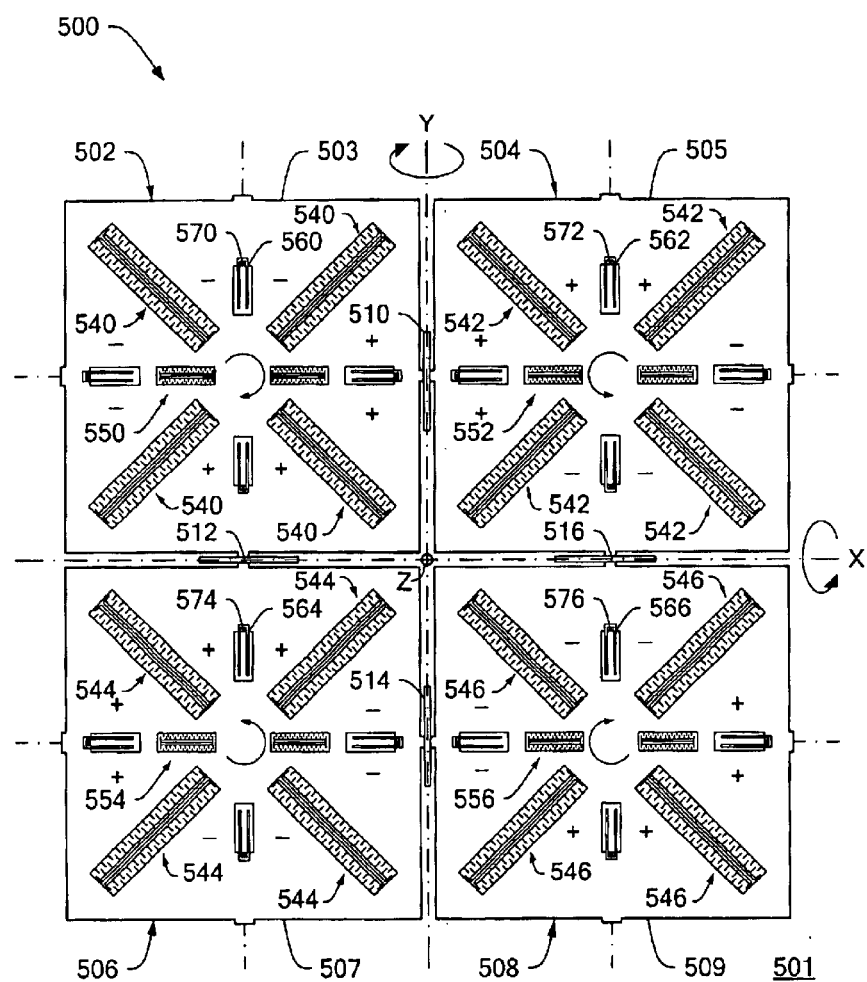
FIG. 5 is a detailed plan view of the micro-machined multi-sensor of FIG. 4.

FIG. 5 depicts a detailed plan view 500 of the micromachined multi-sensor 400 (see FIG. 4). As shown in FIG. 5, the micro-machined multi-sensor 500 comprises accelerometers 502, 504, 506, and 508. The accelerometers 502, 504, 506, and 508 include substantially square-shaped masses 503, 505, 507, and 509, respectively, anchored to and suspended over a substrate 501 by a plurality of flexures. Specifically, each of the flexure structures anchoring and suspending the mass 503 includes an anchor such as the anchor 570 and a stress relief member such as the stress relief member 560, each flexure anchoring/suspending the mass 505 includes an anchor such as the anchor 572 and a stress relief member such as the stress relief member 562, each flexure anchoring/suspending the mass 507 includes an anchor such as the anchor 574 and a stress relief member such as the stress relief member 564, and each flexure anchoring/suspending the mass 509 includes an anchor such as the anchor 576 and a stress relief member such as the stress relief member 566. It is noted that the anchor/stress relief member pairs are disposed along longitudinal and lateral axes of the respective masses 503, 505, 507, and 509. The multi-sensor 500 further comprises fork members 510, 512, 514, and 516 configured to couple the adjacent masses to allow relative antiphase rotational movement, and to resist in phase rotational movement, of the masses, as known in the art.

It is noted that the masses 503, 505, 507, and 509, and the fork members 510, 512, 514, and 516, are substantially equivalent to the masses 403, 405, 407, and 409, and the fork members 410, 412, 414, and 416, respectively, of the multi-sensor 400 (see FIG. 4). Further, rotation-sensing axes X and Y and acceleration-sensing axis Z, as depicted in FIG. 5, correspond to the rotation-sensing axes X and Y and the acceleration-sensing axis Z described above with reference to FIG. 4.

The multi-sensor 500 (see FIG. 5) includes a plurality of drive electrode structures 540, 542, 544, and 546 anchored to the substrate 501, and configured for rotationally vibrating the masses 503, 505, 507, and 509, respectively, such that the adjacent masses vibrate in antiphase. Each of the drive electrode structures 540, 542, 544, and 546 includes a plurality of fingers disposed along a radial axis of the mass, and interdigitated with a corresponding plurality of fingers extending from at least one radial edge of the mass. In the preferred embodiment, the drive electrode structures 540, 542, 544, and 546 are diagonally disposed on the masses 503, 505, 507, and 509, respectively.

The multi-sensor 500 also includes a plurality of velocity sense electrode structures 550, 552, 554, and 556 anchored to the substrate 501, and configured to sense the vibration velocity of the masses 503, 505, 507, and 509, respectively. Like the drive electrode structures 540, 542, 544, and 546, each of the velocity sense electrode structures 550, 552, 554, and 556 includes a plurality of fingers disposed along a radial axis of the mass, and interdigitated with a corresponding plurality of fingers extending from at least one radial edge of the mass. In the preferred embodiment, the velocity sense electrode structures 550, 552, 554, and 556 are disposed along the lateral axes of the masses 503, 505, 507, and 509, respectively. It is noted that "+" and "−" signs are employed in FIG. 5 to indicate the relative directions of deflection of the vibrating masses 503, 505, 507, and 509 due to Coriolis forces applied thereto, as the multi-sensor 500 rotates about a radial axis (not labeled) of the masses.

It should be appreciated that the accelerometers 502, 504, 506, and 508, and the fork members 510, 512, 514, and 516, are arranged in mirror image fashion on each side of a lateral axis of symmetry, and on each side of a longitudinal axis of symmetry, of the multi-sensor 500. Accordingly, the multi-sensor 500 can be symmetrically centered on a die (not shown) to reduce adverse effects of die surface area distortions and gradients on the performance of the multi-sensor 500.

Figure 6:
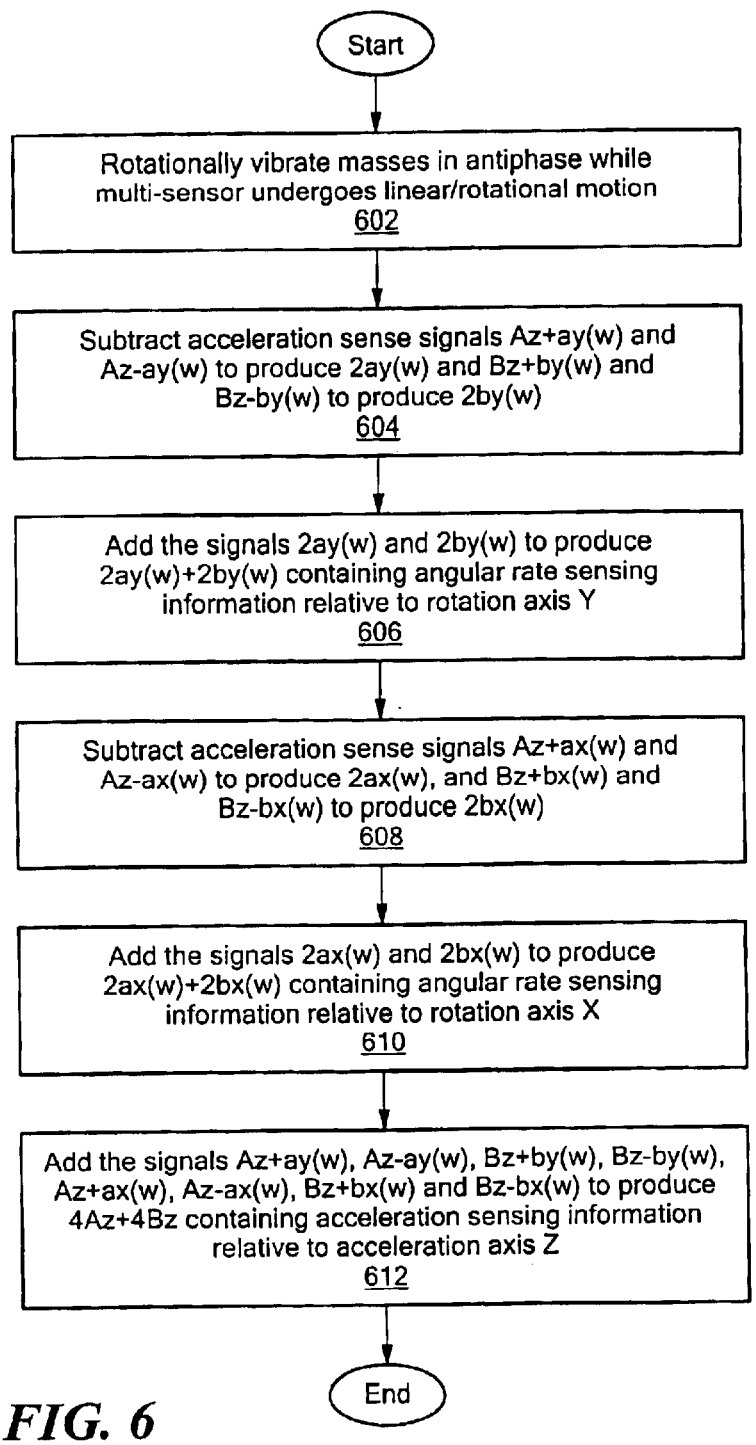
FIG. 6 is a flow diagram of a method of operating the micro-machined multi-sensor of FIG. 2.

A method of operating the presently disclosed micromachined multi-sensor such as the multi-sensor 200 (see FIG. 2) is illustrated by reference to FIG. 6. As depicted in step 602, the masses 203 and 205 are rotationally vibrated in antiphase about the rotation axes 282 and 284, respectively, while the multi-sensor 200 undergoes linear/rotational motion. It is understood that the axes of rotation X and Y are in the plane of the multi-sensor substrate 201, and the axis of linear acceleration Z is perpendicular to the rotation axes. Next, the acceleration sense signals Az+ay(w) and Az−ay(w) generated by the acceleration sense electrode structures 208–209, respectively, are subtracted, as depicted in step 604, to produce the difference of the sense signals 2ay(w), and the acceleration sense signals Bz+by(w) and Bz−by(w) generated by the acceleration sense electrode structures 210–211, respectively, are subtracted, as also depicted in step 604, to produce the difference of the sense signals 2by(w). The signals 2ay(w) and 2by(w) are then added, as depicted in step 606, to produce the sum of the signals 2ay(w)+2by(w), which contains information pertaining to angular rate sensing relative to the rotation axis Y (Y-Rotation). Next, the acceleration sense signals Az+ax(w) and Az−ax(w) generated by the acceleration sense electrode structures 212–213, respectively, are subtracted, as depicted in step 608, to produce the difference of the sense signals 2ax(w), and the acceleration sense signals Bz+bx(w) and Bz−bx(w) generated by the acceleration sense electrode structures 214–215, respectively, are subtracted, as also depicted in step 608, to produce the difference of the sense signals 2bx(w). The signals 2ax(w) and 2bx(w) are then added, as depicted in step 610, to produce the sum of the signals 2ax(w)+2bx(w), which contains information pertaining to angular rate sensing relative to the rotation axis X (X-Rotation). Finally, the signals Az+ay(w), Az−ay(w), Bz+by(w), Bz−by(w), Az+ax(w), Az−ax(w), Bz+bx(w), and Bz−bx(w) are added, as depicted in step 612, to produce the sum 4Az+4Bz, which contains information pertaining to acceleration sensing relative to the acceleration axis Z (Z-Acceleration).

It will further be appreciated by those of ordinary skill in the art that modifications to and variations of the above-described micro-machined multi-sensor providing 1-axis of acceleration sensing and 2-axes of angular rate sensing may be made without departing from the inventive concepts disclosed herein. Accordingly, the invention should not be viewed as limited except as by the scope and spirit of the appended claims.

What is claimed is:

1. A multi-sensor, comprising:
   a substrate;
   at least one first mass coupled to and suspended over the substrate, the first mass having associated longitudinal and lateral axes, and an associated rotation axis perpendicular to the longitudinal and lateral axes associated therewith;
   at least one second mass coupled to and suspended over the substrate, the second mass having associated longitudinal and lateral axes, and an associated rotation axis perpendicular to the longitudinal and lateral axes associated therewith, the second mass being adjacent to the first mass,
   at least one drive structure operatively coupled to the first and second masses, the drive structure being configured to vibrate the first and second masses in antiphase about the respective rotation axes;
   first and second pairs of diametrically opposed acceleration sensing structures operatively coupled to the first mass, the first and second acceleration sensing structure pairs being disposed along the longitudinal and lateral axes, respectively, of the first mass; and
   third and fourth pairs of diametrically opposed acceleration sensing structures operatively coupled to the second mass, the third and fourth acceleration sensing structure pairs being disposed along the longitudinal and lateral axes, respectively, of the second mass,
   wherein the respective longitudinal and lateral axes associated with the first and second masses define a plane substantially parallel to a substrate plane,
   wherein the respective longitudinal axes are parallel to a first rotation-sensing axis, and the respective lateral axes are parallel to a second rotation-sensing axis, the first and second rotation-sensing axes being substantially within the substrate plane,
   wherein each acceleration sensing structure is configured to produce a respective sense signal, the respective sense signals including information pertaining to angular rate sensing relative to the first and second rotation-sensing axes, and further including information pertaining to acceleration sensing relative to an acceleration-sensing axis perpendicular to the substrate plane,
   wherein each of the respective sense signals produced by the first and third pairs of acceleration sensing structures includes a linear component relative to the acceleration-sensing axis and a rotational component relative to the first rotation-sensing axis, and wherein each of the respective sense signals produced by the second and fourth pairs of acceleration sensing structures includes a linear component relative to the acceleration-sensing axis and a rotational component relative to the second rotation-sensing axis, and further including a signal processing unit configured to combine the respective linear sense signal components produced by the first, second, third, and fourth pairs of acceleration sensing structures to produce an output signal including information pertaining to acceleration sensing relative to the acceleration-sensing axis.

2. The multi-sensor of claim 1 wherein the signal processing unit is further configured to combine the respective rotational sense signal components produced by the first and third pairs of acceleration sensing structures to produce an output signal including information pertaining to angular rate sensing relative to the first rotation-sensing axis.

3. The multi-sensor of claim 1 wherein the signal processing unit is further configured to combine the respective rotational sense signal components produced by the second and fourth pairs of acceleration sensing structures to produce an output signal including information pertaining to angular rate sensing relative to the second rotation-sensing axis.

4. The multi-sensor of claim 1 further including a resilient member coupling the first mass and the second mass, the resilient member being configured to allow the antiphase vibrational movement, and to resist in phase vibrational movement, of the respective masses.

5. The multi-sensor of claim 1 including two first masses and two second masses suspended over the substrate, the four masses being arranged so that each mass is adjacent to two other masses, and wherein the drive structure is configured to vibrate the four masses in antiphase about the respective rotation axes so that each mass moves in an equal and opposite manner relative to an adjacent mass.

6. The multi-sensor of claim 1 wherein at least the first and second masses are micro-machined on the substrate, the first and second rotation-sensing axes being in the plane of the micro-machined substrate.

7. A multi-sensor, comprising:

a substrate;

at least one first mass coupled to and suspended over the substrate, the first mass having associated longitudinal and lateral axes, and an associated rotation axis perpendicular to the longitudinal and lateral axes associated therewith;

at least one second mass coupled to and suspended over the substrate, the second mass having associated longitudinal and lateral axes, and an associated rotation axis perpendicular to the longitudinal and lateral axes associated therewith, the second mass being adjacent to the first mass, at least one drive structure operatively coupled to the first and second masses, the drive structure being configured to vibrate the first and second masses in antiphase about the respective rotation axes;

first and second pairs of diametrically opposed acceleration sensing structures operatively coupled to the first mass, the first and second acceleration sensing structure pairs being disposed along the longitudinal and lateral axes, respectively, of the first mass; and third and fourth pairs of diametrically opposed acceleration sensing structures operatively coupled to the second mass, the third and fourth acceleration sensing structure pairs being disposed along the longitudinal and lateral axes, respectively, of the second mass, wherein the respective longitudinal and lateral axes associated with the first and second masses define a plane substantially parallel to a substrate plane;

wherein the respective longitudinal axes are parallel to a first rotation-sensing axis, and the respective lateral axes are parallel to a second rotation-sensing axis, the first and second rotation-sensing axes being substantially within the substrate plane, wherein each acceleration sensing structure is configured to produce a respective sense signal, the respective sense signals including information pertaining to angular rate sensing relative to the first and second rotation-sensing axes, and further including information pertaining to acceleration sensing relative to an acceleration-sensing axis perpendicular to the substrate plane, and further including a first amplifier configured to receive a pair of first sense signals from the first pair of acceleration sensing structures, and a third amplifier configured to receive a pair of third sense signals from the third pair of acceleration sensing structures, the first and third amplifiers being further configured to produce first and third output signals comprising the difference of the pair of first sense signals, and the difference of the pair of third sense signals, respectively, the first and third output signals including information pertaining to angular rate sensing relative to the first rotation-sensing axis.

8. A multi-sensor, comprising:

a substrate;

at least one first mass coupled to and suspended over the substrate, the first mass having associated longitudinal and lateral axes, and an associated rotation axis perpendicular to the longitudinal and lateral axes associated therewith;

at least one second mass coupled to and suspended over the substrate, the second mass having associated longitudinal and lateral axes, and an associated rotation axis perpendicular to the longitudinal and lateral axes associated therewith, the second mass being adjacent to the first mass, at least one drive structure operatively coupled to the first and second masses, the drive structure being configured to vibrate the first and second masses in antiphase about the respective rotation axes;

first and second pairs of diametrically opposed acceleration sensing structures operatively coupled to the first mass, the first and second acceleration sensing structure pairs being disposed along the longitudinal and lateral axes, respectively, of the first mass; and third and fourth pairs of diametrically opposed acceleration sensing structure operatively coupled to the second mass, the third and fourth acceleration sensing structure pairs being disposed along the longitudinal and lateral axes, respectively, of the second mass, wherein the respective longitudinal and lateral axes associated with the first and second masses define a plane substantially parallel to a substrate plane;

wherein the respective longitudinal axes are parallel to a first rotation-sensing axis, and the respective lateral axes are parallel to a second rotation sensing axis, the first and second rotation-sensing axes being substantially within the substrate plane, wherein each acceleration sensing structure is configured to produce a respective sense signal, the respective sense signals including information pertaining to angular rate sensing relative to the first and second rotation-sensing axes, and further including information pertaining to acceleration sensing relative to an acceleration-sensing axis perpendicular to the substrate plane, and further including a second amplifier configured to receive a pair of second sense signals from the second pair of acceleration sensing structures, and a fourth amplifier configured to receive a pair of fourth sense signals from the fourth pair of acceleration sensing structures, the second and fourth amplifiers being further configured to produce second and fourth output signals comprising the difference of the pair of second sense signals, and the difference of the pair of fourth sense signals, respectively, the second and fourth output signals including information pertaining to angular rate sensing relative to the second rotation-sensing axis.

9. A multi-sensor, comprising:

a substrate;

at least one first mass coupled, to and suspended over the substrate, the first mass having associated longitudinal and lateral axes, and an associated rotation axis perpendicular to the longitudinal and lateral axes associated therewith;

at least one second mass coupled to and suspended over the substrate, the second mass having associated longitudinal and lateral axes, and an associated rotation axis perpendicular to the longitudinal and lateral axes associated therewith, the second mass being adjacent to the first mass, at least one drive structure operatively coupled to the first and second masses, the drive structure being configured to vibrate the first and second masses in antiphase about the respective rotation axes;

first and second pairs of diametrically opposed acceleration sensing structures operatively coupled to the first mass, the first and second acceleration sensing structure pairs being disposed along the longitudinal and lateral axes, respectively, of the first mass; and third and fourth pairs of diametrically opposed acceleration sensing structures operatively coupled to the second mass, the third and fourth acceleration sensing structure pairs being disposed along the longitudinal and lateral axes, respectively, of the second mass, wherein the respective longitudinal and lateral axes associated with the first and second masses define a plane substantially parallel to a substrate plane;

wherein the respective longitudinal axes are parallel to a first rotation-sensing axis, and the respective lateral axes are parallel to a second rotation-sensing axis, the first and second rotation-sensing axes being substantially within the substrate plane, wherein each acceleration sensing structure is configured to produce a respective sense signal, the respective sense signals including information pertaining to angular rate sensing relative to the first and second rotation-sensing axes, and further including information pertaining to acceleration sensing relative to an acceleration-sensing axis perpendicular to the substrate plane, and further including a first amplifier configured to receive a pair of first sense signals from the first pair of acceleration sensing structures, a second amplifier configured to receive a pair of second sense signals from the second pair of acceleration sensing structures, a third amplifier configured to receive a pair of third sense signals from the third pair of acceleration sensing structures, and a fourth amplifier configured to receive a pair of fourth sense signals from the fourth pair of acceleration sensing structures, the first, second, third, and fourth amplifiers being further configured to produce first, second, third, and fourth output signals comprising the sum of the pair of first sense signals, the sum of the pair of second sense signals, the sum of the pair of third sense signals, and the sum of the pair of fourth sense signals, respectively, the first, second, third, and fourth output signals including information pertaining to acceleration sensing relative to the acceleration-sensing axis.

10. A method of operating a multi-sensor, comprising the steps of:

vibrating in antiphase at least one first mass and at least one second mass about respective rotation axes by a drive structure, the first and second masses being adjacent to each other and being coupled to and suspended over a substrate, each mass having associated longitudinal and lateral axes perpendicular to the respective rotation axis, wherein the respective longitudinal and lateral axes associated with the first and second masses define a plane substantially parallel to a substrate plane, the respective longitudinal axes being parallel to a first rotation-sensing axis, and the respective lateral axes being parallel to a second rotation-sensing axis, the first and second rotation-sensing axes being substantially within the substrate plane;

producing respective sense signals by first and second pairs of diametrically opposed acceleration sensing structures operatively coupled to the first mass, the first and second acceleration sensing structure pairs being disposed along the longitudinal and lateral axes, respectively, of the first mass; and producing respective sense signals by third and fourth pairs of diametrically opposed acceleration sensing structures operatively coupled to the second mass, the third and fourth acceleration sensing structure pairs being disposed along the longitudinal and lateral axes, respectively, of the second mass, wherein the respective sense signals produced in the first and second producing steps include information pertaining to angular rate sensing relative to the first and second rotation-sensing axes, and further include information pertaining to acceleration sensing relative to an acceleration-sensing axis perpendicular to the substrate plane, wherein each of the respective sense signals produced by the first and third pairs of acceleration sensing structures in the first and second producing steps includes a linear component relative to the acceleration-sensing axis and a rotational component relative to the first rotation-sensing axis, and wherein each of the respective sense signals produced by the second and fourth pairs of acceleration sensing structures in the first and second producing steps includes a linear component relative to the acceleration-sensing axis and a rotational component relative to the second rotation-sensing axis, and further including the step of combining the respective linear sense signal components produced by the first, second, third, and fourth pairs of acceleration sensing structures by a signal processing unit to produce an output signal including information pertaining to acceleration sensing relative to the acceleration-sensing axis.

11. The method of claim 10 further including the step of combining the respective rotational sense signal components produced by the first and third pairs of acceleration sensing structures by the signal processing unit to produce an output signal including information pertaining to angular rate sensing relative to the first rotation-sensing axis.

12. The method of claim 10 further including the step of combining the respective rotational sense signal components produced by the second and fourth pairs of acceleration sensing structures by the signal processing unit to produce an output signal including information pertaining to angular rate sensing relative to the second rotation-sensing axis.

13. The method of claim 10 wherein the vibrating step includes vibrating two first masses and two second masses in antiphase about the respective rotation axes by a drive structure, the four masses being suspended over the substrate, the four masses being arranged so that each mass is adjacent to two other masses, the four masses being vibrated by the drive structure so that each mass moves in an equal and opposite manner relative to an adjacent mass.

14. A method of operating a multi-sensor, comprising the steps of:

vibrating in antiphase at least one first mass and at least one second mass about respective rotation axes by a drive structure, the first and second masses being adjacent to each other and being coupled to and suspended over a substrate, each mass having associated longitudinal and lateral axes perpendicular to the respective rotation axis, wherein the respective longitudinal and lateral axes associated with the first and second masses define a plane substantially parallel to a substrate plane, the respective longitudinal axes being parallel to a first rotation-sensing axis, and the respective lateral axes being parallel to a second rotation-sensing axis, the first and second rotation-sensing axes being substantially within the substrate plane;

producing respective sense signals by first and second pairs of diametrically opposed acceleration sensing structures operatively coupled to the first mass, the first and second acceleration sensing structure pairs being disposed along the longitudinal and lateral axes, respectively, of the first mass; and producing respective sense signals by third and fourth pairs of diametrically opposed acceleration sensing structures operatively coupled to the second mass, the third and fourth acceleration sensing structure pairs being disposed along the longitudinal and lateral axes, respectively, of the second mass, wherein the respective sense signals produced in the first and second producing steps include information pertaining to angular rate sensing relative to the first and second rotation-sensing axes, and further include information pertaining to acceleration sensing relative to an acceleration-sensing axis perpendicular to the substrate plane, and further including the steps of receiving a pair of first sense signals from the first pair of acceleration sensing structures by a first amplifier, receiving a pair of third sense signals from the third pair of acceleration sensing structures by a third amplifier, and producing first and third output signals comprising the difference of the pair of first sense signals, and the difference of the pair of third sense signals, respectively, by the first and third amplifiers, the first and third output signals including information pertaining to angular rate sensing relative to the first rotation-sensing axis.

15. A method of operating a multi-sensor, comprising the steps of:

vibrating in antiphase at least one first mass and at least one second mass about respective rotation axes by a drive structures, the first and second masses being adjacent to each other and being coupled to and suspended over a substrate, each mass having associated longitudinal and lateral axes perpendicular to the respective rotation axis, wherein the respective longitudinal and lateral axes associated with the first and second masses define a plane substantially parallel to a substrate plane, the respective longitudinal axes being parallel to a first rotation-sensing axis, and the respective lateral axes being parallel to a second rotation-sensing axis, the first and second rotation-sensing axes being substantially within the substrate plane;

producing respective sense signals by first and second pairs of diametrically opposed acceleration sensing structures operatively coupled to the first mass, the first and second acceleration sensing structure pairs being disposed along the longitudinal and lateral axes, respectively of the first mass; and producing respective sense signals by third and fourth pairs of diametrically opposed acceleration sensing structures operatively coupled to the second mass, the third and fourth acceleration sensing structure pairs being disposed along the longitudinal and lateral axes, respectively, of the second mass, wherein the respective sense signals produced in the first and second producing steps include information pertaining to angular rate sensing relative to the first and second rotation-sensing axes, and further include information pertaining to acceleration sensing relative to an acceleration-sensing axis perpendicular to the substrate plane, and further including the steps of receiving a pair of second sense signals from the second pair of acceleration sensing structures by a second amplifier, receiving a pair of fourth sense signals from the fourth pair of acceleration sensing structures by a fourth amplifier, and producing second and fourth output signals comprising the difference of the pair of second sense signals, and the difference of the pair of fourth sense signals, respectively, by the second and fourth amplifiers, the second and fourth output signals including information pertaining to angular rate sensing relative to the second rotation-sensing axis.

16. A method of operating a multi-sensor, comprising the steps of:

vibrating in antiphase at least one first mass and at least one second mass about respective rotation axes by a drive structure, the first and second masses being adjacent to each other and being coupled to and suspended over a substrate, each mass having associated longitudinal and lateral axes perpendicular to the respective rotation axis, wherein the respective longitudinal and lateral axes associated with the first and second masses define a plane substantially parallel to a substrate plane, the respective longitudinal axes being parallel to a first rotation-sensing axis, and the respective lateral axes being parallel to a second rotation-sensing axis, the first and second rotation-sensing axes being substantially within the substrate plane;

producing respective sense signals by first and second pairs of diametrically opposed acceleration sensing structures operatively coupled to the first mass, the first and second acceleration sensing structure pairs being disposed along the longitudinal and lateral axes, respectively, of the first mass; and producing respective sense signals by third and fourth pairs of diametrically opposed acceleration sensing structures operatively coupled to the second mass, the third and fourth acceleration sensing structure pairs being disposed along the longitudinal and lateral axes, respectively, of the second mass, wherein the respective sense signals produced in the first and second producing steps include information pertaining to angular rate sensing relative to the first and second rotation-sensing axes, and further include information pertaining to acceleration sensing relative to an acceleration-sensing axis perpendicular to the substrate plane, and further including the steps of receiving a pair of first sense signals from the first pair of acceleration sensing structures by a first amplifier, receiving a pair of second sense signals from the second pair of acceleration sensing structures by a second amplifier, receiving a pair of third sense signals from the third pair of acceleration sensing structures by a third amplifier, receiving a pair of fourth sense signals from the fourth pair of acceleration sensing structures by a fourth amplifier, and producing first, second, third, and fourth output signals comprising the sum of the pair of first sense signals, the sum of the pair of second sense signals, the sum of the pair of third sense signals, and the sum of the pair of fourth sense signals, respectively, by the first, second, third, and fourth amplifiers, the first, second, third, and fourth output signals including information pertaining to acceleration sensing relative to the acceleration-sensing axis.

* * * * *